United States Patent

Kalopissis

[15] 3,671,643

[45] June 20, 1972

[54] TREATMENT OF EXCESSIVE SEBACEOUS GLANDS SECRETION WITH SUBSTITUTED CYSTEAMINE COMPOUNDS

[72] Inventor: Gregoire Kalopissis, Paris, France

[73] Assignee: Societe Anonyme dite:-L'Oreal, Paris, France

[22] Filed: Sept. 15, 1969

[21] Appl. No.: 858,161

Related U.S. Application Data

[63] Continuation-in-part of Ser. No. 736,960, June 14, 1968, abandoned, Continuation-in-part of Ser. No. 801,840, Feb. 24, 1969.

[30] Foreign Application Priority Data

| Jan. 29, 1964 | France | 641472021 |
| Dec. 22, 1965 | Luxembourg | 55553 |
| June 21, 1967 | France | 671560250 |
| July 28, 1967 | France | 6794913 |
| Feb. 23, 1968 | Luxembourg | 55553 |
| April 19, 1968 | Luxembourg | 55935 |
| June 3, 1969 | Belgium | 733993 |

[52] U.S. Cl. ............ 424/330, 424/75, 424/230, 424/263, 424/264, 424/275, 424/280, 424/316, 424/319, 424/324, 424/325, 424/329

[51] Int. Cl. ............................................ A61k 27/00

[58] Field of Search ............................................ 424/330

[56] References Cited

UNITED STATES PATENTS

| 2,769,839 | 11/1956 | Fincke | 260/570.5 |
| 2,835,704 | 5/1958 | Walton | 260/562 |

FOREIGN PATENTS OR APPLICATIONS

| 1,085,513 | 7/1954 | France | 260/501.12 |
| 79,717 | 11/1955 | Netherlands | 260/561 S |

Primary Examiner—Albert T. Meyers
Assistant Examiner—Vera C. Clarke
Attorney—Holcombe, Wetherill & Brisebois

[57] ABSTRACT

A process of treating acne with a composition containing substituted cysteamine compounds.

2 Claims, No Drawings

TREATMENT OF EXCESSIVE SEBACEOUS GLANDS SECRETION WITH SUBSTITUTED CYSTEAMINE COMPOUNDS

This application is a continuation-in-part of application Ser. No. 736,960, filed June 14, 1968, now abandoned, and application Ser. No. 801,840, filed Feb. 24, 1969.

SUMMARY OF THE INVENTION

The present invention relates to new composition and to a new process for diminishing excessive secretions by the sebaceous glands of the skin.

It is known that in certain cases the sebaceous glands of the skin produce excessive secretions which lead to an objectional appearance, and may lead in some cases to certain forms of acne. The invention is based on the discovery that certain compositions are useful in diminishing such excessive secretions and that these compositions are also useful in treating acne.

It is the object of the present invention to provide a new cosmetic composition which may be applied to the skin to diminish excessive secretion of the sebaceous glands. This composition is characterized by the fact that it contains in a suitable cosmetic vehicle at least one active compound selected from the group consisting of the S–substituted derivative of cysteine and the S–substituted derivative of cysteamine.

Among the active compounds which may be used in the above-defined compositions are:

1. Those compounds corresponding to the following formula:

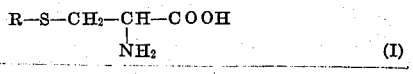

(I)

in which R is selected from the group consisting of $(C_6H_5)_3$—C—, $(C_6H_5)_2$—CH—, $C_6H_5$—$CH_2$— and HOOC—$(CH_2)_n$, in which $n$ represents a whole number equal to or less than 4, and preferably 1 or 2.

These compounds may be used in the form of their mineral or organic acid salts, or in an esterified form, by an alcohol having up to six carbon atoms.

A hydrogen atom from the amine function may be replaced by a —COR' or —$SO_2R'$ radical, in which R' represents an alkyl group having up to six carbon atoms or an aryl radical, such as 3-pyridyl, phenyl substituted by $CH_3$, alkoxy radical, acetamido radical or an aralkyl radical.

2. Those compounds corresponding to the following formula:

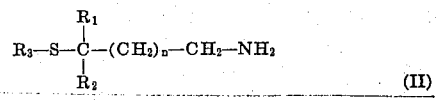

(II)

in which:

$R_1$ and $R_2$ represent a hydrogen atom or a lower alkyl radical having one to three carbon atoms, and may be identical or different;

$R_3$ represents a radical having the formula —$(CH_2)_p$—$R_4$ in which:

$R_4$ represents — $C_6H_5$ or —CHOH — $CH_2$ — $N^+$ $(CH_3)_3$ $Cl^-$ or —$COOR_5$ ($R_5$ representing either an atom of hydrogen or a lower alkyl radical having one to six carbon atoms)

or a tertiary butyl radical —$C(CH_3)_3$ or a trityl radical —$C(C_6H_5)_3$ or —$CH_2$ — $NH_2$ or —CH—$NH_2$
  |
  $COOR_5$ or the 2-thienyl radical:

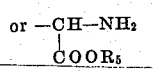

or the 2-(N-oxypyridyl)radical:

$p$ is equal to 0, 1 or 2; and $n$ is equal to 0 or 1.

The compounds of this group are preferably used in the form of their salt with a mineral or inorganic acid, such for example as the halohydric acids, salicylic acid, para-toluenesulfonic acid, citric acid, phosphoric acid, malic acid, tartaric acid, nicotinic acid, or ascorbic acid. Compounds of this type which have a carboxylic group may advantageously be esterified to increase their liposolubility.

A hydrogen atom from the amine functions of the compounds of this group may be replaced by a —COR' radical or an —$SO_2$ R', radical in which R' represents a lower alkyl or aryl radical.

3. The compounds corresponding to the following formula:

$$R - S - CH_2 - CH_2 - NH_2 \quad \text{III}$$

in which R represents a hydrocarbon radical having up to 20 carbon atoms, which may be saturated or unsaturated and have a branched or linear chain, and may comprise one or more heteros forms and one or more alcohol groups, one of which may be terminal.

R may be an alkyl such as —$CH_3$, — $C_{10}H_{21}$, —$C_{20}H_{41}$, an alkenyl such as —$C_2H_3$, — $C_{10}H_{19}$, — $C_{20}H_{39}$, a heterocyclic group such as

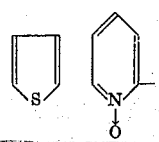

a hydrocarbon radical such as : — $C_2H_5$ — O ——$C_2H_4$—$NH_2$ ;—$C_2H_4$ — NH — $C_2H_4OH$; —$(C_2H_4O)_5$ H;

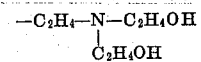

— $C_2H_4$ NH — $C_2H_4$ — $NH_2$

These compounds may be used in the form of free bases or in the form of their salts with acids such as hydrochloric acid, phenylacetic acid, undecylenic acid and sorbic acid.

A hydrogen atom from the amine function may be replaced by a —COR' radical or an —$SO_2$ R' radical in which R' represents an alkyl or aryl radical as defined above.

4. The salts corresponding to the following formula:

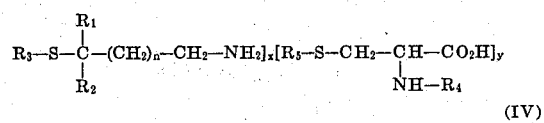

(IV)

in which:

$n=0$ or 1, $R_1$ and $R_2$ may be identical or different and are selected from the group consisting of a hydrogen atom and a lower alkyl radical having 1 to 3 carbon atoms.

$R_3$ represents a group corresponding to the formula :

—$(CH_2)_p$—$R_6$ (in which p is equal to 0, 1 or 2) and in which $R_6$ represents :

— $C_6H_5$,

— COOR (R representing a lower alkyl radical),

— $C(CH_3)_3$, or —$C(C_6H_5)_3$

—CH—NH—$R_7$
  |
  $COOR_8$ ( $R_7$ representing a hydrogen atom or an acyl or sulfonyl radical, $R_8$ represents a lower alkyl radical or a hydrogen atom only when $R_7$ represents a hydrogen atom),

— $CH_2$ — NH — $R_7$, the 2-thienyl radical having the formula:

- the 2-pyridyl radical,
- the 2-(N-oxypyridyl) radical having the formula:

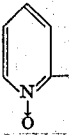

or a saturated or unsaturated, linear or branched chain hydrocarbon radical having up to 20 carbon atoms, which may have one or more heteroatoms in its chain and one or more alcohol groups, one of which may be terminal, the preferred hydrocarbons are those that have been listed above.

$R_4$ represents:
- either a hydrogen atom, in which case:
$R_5$ represents a $-(CH_2)_m-CHO_2$ radical, in which $m$ is a whole number from 1 to 5 inclusive, and
  · $y=1$ and $x=1$, if $R_3$ does not include a free amine group,
  · $y=2$ and $x=1$, if $R_3$ does include a free amine group,
- or an acyl or sulfonyl radical, in which case $R_5$ may be:
  · $(C_6H_5)_3C-$, $(C_6H_5)_2CH-$, or $C_6H_5$-$CH_2-$, in which case:
  · $y=1$ and $x=1$, if $R_3$ does not include a free amine group, and
  · $y=2$ and $x=1$, if $R_3$ does include a free amine group,
  · $-(CH_2)_m - CO_2H$, in which case
  · $y=1$ and $x=1$, if $R_3$ includes a free amine group,
  · $y=1$ and $x=2$, if $R_3$ does not include a free amine group.

In all of the above cases in which the active compound comprises a free carboxylic acid group, this may take the form of a complex with a cationic quaternary ammonium bactericide, such for example as [diisobutylphenoxyethoxyethyl dimethyl benzyl] ammonium chloride monohydrate or [diisobutyl cresoxyethoxyethyl dimethyl benzyl] ammonium chloride monohydrate.

Among the active compounds corresponding to the above formulas are:
- S-trityl-l-cysteine having the formula:

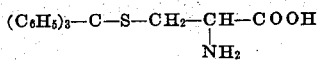

and its hydrochloride,
- S-(2(carboxyethyl)-l-cysteine having the formula:

HOOC—CH₂—CH₂—S—CH₂—CH—COOH
                              |
                              NH₂ and its hydrochloride,
- S-(carboxymethyl) cysteamine having the formula:
  HOOC — CH₂ — S — CH₂ — CH₂ — NH₂
and its hydrochloride,
- S-tritylcysteamine having the formula: $(C_6H_5)_3$ — C — S — CH₂ — CH₂ — NH₂
and its hydrochloride,
- S-benzylcysteamine hydrochloride having the formula:
  C₆H₅ — CH₂ — S — CH₂ — CH₂ — NH₂, HCl

- (3- β- aminoethylthio-2-hydroxy) propyltrimethylammonium hydrochloride having the formula:
(CH₃)₃ — N⁺ — CH₂ — CHOH — CH₂ — S — CH₂ — CH₂ —NH₂, HCl
- S-(carboxymethyl)-methyl cysteinate having the formula:

HOOC—CH₂—S—CH₂—CH—COOCH₃
                      |
                      NH₂

- S-(methoxycarbonylmethyl) cysteine having the formula:

H₃C—OCO—CH₂—S—CH₂—CH—COOH
                        |
                        NH₂ and its hydrochloride,
- N-acetyl-S-benzylcysteamine having the formula:

C₆H₅—CH₂—S—CH₂—CH₂—NH
                       |
                       CO—CH₃

-S-benzylcysteamine dicitrate having the formula:

CH₂—CO₂H, H₂N—CH₂—CH₂—S—CH₂—C₆H₅
|
HO₂C—C—OH
|
CH₂—CO₂H, H₂N—CH₂—CH₂—S—CH₂—C₆H₅

- S-benzylcysteamine salicylate having the formula:

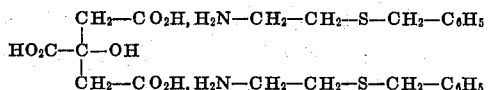

- S-benzylcysteamine p-toluenesulfonate having the formula:

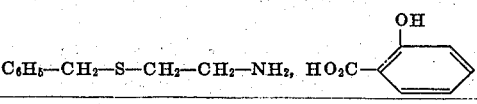

- S-benzylcysteamine nicotinate having the formula:

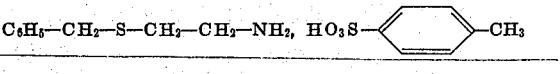

- S-benzylcysteamine hydrobromide having the formula:
  C₆H₅ — CH₂ — S — CH₂ — CH₂ — NH₂, HBr
- S-benzylcysteamine ditartrate having the formula:

C₆H₅—CH₂—S—CH₂—CH₂—NH₂, HO₂C—CHOH
C₆H₅—CH₂—S—CH₂—CH₂—NH₂, HO₂C—CHOH

-S-benzylcysteamine malate having the formula: C₆H₅—CH₂—S—CH₂—CH₂—NH₂, HO₂C—CH₂—CHOH—CO₂H
- the diacid phosphate of S-benzylcysteamine having the formula:
  C₆H₅ — CH₂ — S — CH₂ — CH₂ — NH₂, H₃PO₄
- S-thienylcysteamine having the formula:

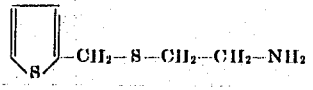

and its hydrochloride,

- N-acetyl-S-thienylcysteamine having the formula:

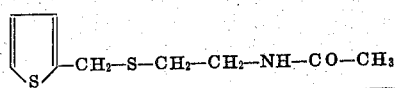

- the N-oxide of 2-(2-aminoethylthio) pyridine having the formula:

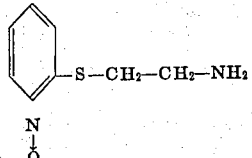

and its hydrochloride,
- S-benzylcysteamine ascorbate having the formula:

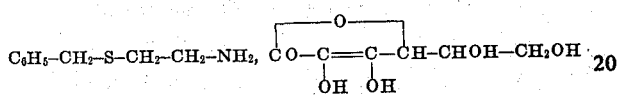

- S-methylcysteamine having the formula: $CH_3 - S - CH_2 - CH_2 - NH_2$
and its hydrochloride,
- S-methylcysteamine phenylacetate having the formula: $CH_3 - S - CH_2 - CH_2 - NH_2, HO_2C - CH_2 - C_6H_5$
- S-methylcysteamine undecylenate having the formula: $CH_3 - S - CH_2 - CH_2 - NH_2, HO_2C-(CH_2)_8 - CH = CH_2$
- S-methylcysteamine sorbate having the formula: $CH_3 - S - CH_2 - CH_2 - NH_2, HO_2C - CH = CH - CH = CH - CH_3$
- S-(2-hydroxyethyl) cysteamine hydrochloride having the formula:
$HOCH_2 - CH_2 - S - CH_2 - CH_2 - NH_2, HCl$
- S-laurylcysteamine hydrochloride having the formula: $CH_3 - (CH_2)_{11} - S - CH_2 - CH_2 - NH_2, HCl$
- S-cetylcysteamine hydrochloride having the formula: $CH_3 - (CH_2)_{15} - S - CH_2 - CH_2 - NH_2, HCl$
- 5-amino-5-carboxy-3-thia-pentanoate of 2-benzylthioethylamine having the formula:

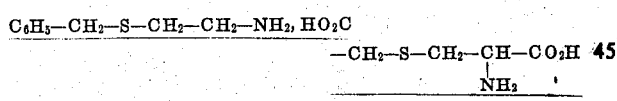

- 5-amino-5-carboxy-3-thia-pentanoate of S-(2-aminoethyl)-cysteine, having the formula:

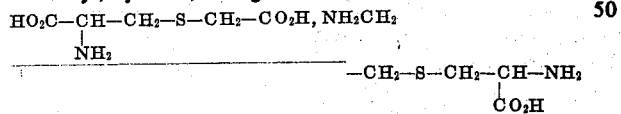

- 5-amino-5-carboxy-3-thia-pentanoate of 2-methylthioethylamine, having the formula:

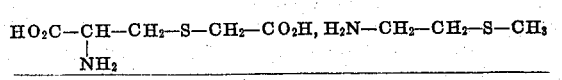

- 5-amino-5-carboxy-3-thia-pentanoate of 3-benzylthiopropylamine, having the formula:

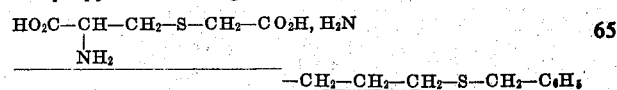

- 6-amino-6-carboxy-4-thia-hexanoate of benzyl-2-thioethylamine, having the formula:

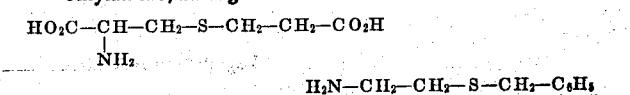

- 5-amino-5-carboxy-3-thia-pentanoate of 2-(2,2-dimethoxyethylthio)-ethylamine, having the formula:

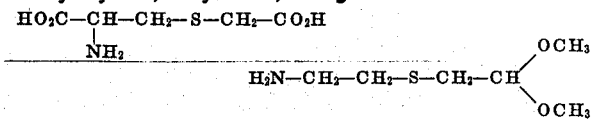

- N-acetyl-S-benzyl-l-cysteinate of 2-methylthioethylamine, having the formula:

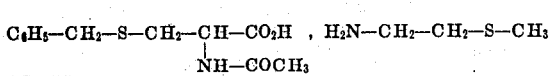

- 5-benzoylamino-3-thia-hexanedioate of di-(2-benzylthioethylamine), having the formula:

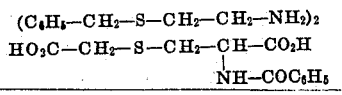

- 5-nicotinylamino-3-thia-hexanedioate of di-(2-benzylthioethylamine), having the formula:

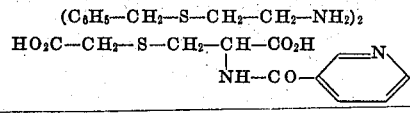

- 5-p-toluenesulfonylamino-3-thia-hexanedioate of di-(2-benzylthioethylamine), having the formula:

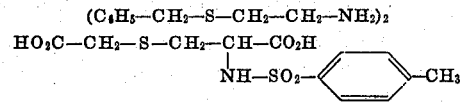

- 5-p-acetamidobenzenesulfonylamino-3-thia-hexanedioate of di(2-benzylthioethylamine), having the formula:

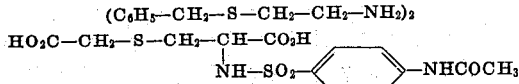

- 5-p-acetamidobenzoylamino-3-thia-hexanedioate of di-(2-benzylthioethylamine), having the formula:

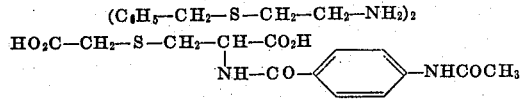

- 5-ortho-hydroxybenzoylamino-3-thia-hexanedioate of di(2-benzylthioethylamine), having the formula:

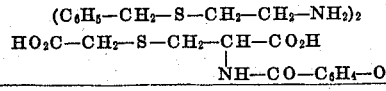

- 2-acetamido-4-thia-heptanedioate of di-(2-methylthioethylamine), having the formula:

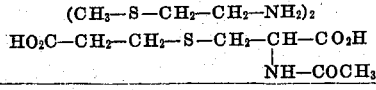

- 9-amino-9(carboxy-7-thia-nonanoate of 2-benzylthioethylamine, having the formula:

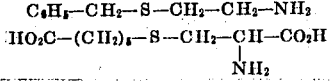

- 2-acetamido-4-thia-nonanedioate of 2,2-thio-bis (ethylamine), having the formula:

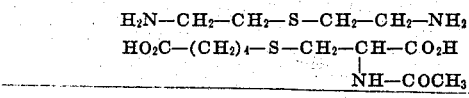

- 5-acetamido-3-thia-hexanedioate of di-(2-benzylthio-ethylamine), having the formula:

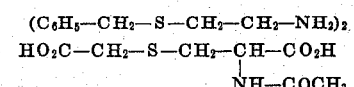

The composition according to the invention is preferably used in the form of a cream, milk, gel, dermatological cake, or an aerosol foam. It may also take the form of an aqueous or hydroalcoholic lotion.

The composition according to the invention will ordinarily contain 0.1–3 percent of the active compound as above defined.

The composition according to the invention may also contain any of the conventional ingredients of facial creams such as greases, emulsifiers, preservatives, perfumes, dyes and waxes.

They may also contain colored pigments which make it possible to tint the skin and to mask esthetic defects of the skin, while the active products reduce the excessive activity of the sebaceous glands.

It is a further object of the present invention to provide a new method of diminishing excessive secretion by the sebaceous glands of the skin in order to reduce acne, which method is characterized by the fact that a composition such as defined above is applied to the surfaces to be treated.

In order that the invention may be better understood, several examples of compositions embodying the invention will now be given, purely by way of example.

EXAMPLE 1

An anti-acne cream for use on the face is prepared by mixing together:

| | |
|---|---|
| S-benzylcysteamine hydrochloride | 2 g |
| cetyl-stearyl alcohol oxyethylenated with 15 moles of ethylene oxide | 7 g |
| Silicone oil (dimethylpolysiloxane having a viscosity of 20–22 centipoises at room temperature) | 1 g |
| Diethylene glycol stearate | 6 g |
| Preservative containing methyl para-hydroxybenzoate sold commercially under the trademark NIPAGINE | 0.10 g |
| Preservative containing propyl para-hydroxybenzoate sold commercially under the trademark NIPASOL | 0.10 g |
| Water, q.s.p. | 100 cc |

EXAMPLE 2

An anti-acne cream is prepared by mixing the following constituents:

| | |
|---|---|
| S-benzylcysteamine hydrochloride | 2 g |
| Cetyl stearyl alcohol oxyethylenated with 15 moles of ethylene oxide | 7 g |
| Silicone oil | 1 g |
| Polyglycol stearate | 6 g |
| Para-hydroxybenzoic acid ester | 0.20 g |
| Water, q.s.p. | 100 g |

EXAMPLE 3

A masking cream designed to treat acne while masking the blackheads is prepared by mixing the following ingredients:

| | |
|---|---|
| S-benzylcysteamine hydrochloride | 2 g |
| Titanium oxide | 10 g |
| Red iron oxide | 0.3 g |
| Yellow iron oxide | 0.2 g |
| Brown iron oxide | 0.4 g |
| Chestnut iron oxide | 0.2 g |
| Cetyl stearyl alcohol oxyethylenated with 15 moles of ethylene oxide | 7 g |
| Silicone oil | 1 g |
| Polyglycol stearate | 6 g |
| Para-hydrobenzoic acid ester | 0.20 g |
| Water, q.s.p. | 100 g |

EXAMPLE 4

A milk is prepared by mixing together the following ingredients:

| | |
|---|---|
| S-tritylcysteamine hydrochloride | 2 g |
| Reticulated polyacrylic acid sold commercially under the trademark CARBOPOL 934 | 0.375 g |
| Isopropyl esters of fatty acids of lanolin | 1 g |
| Lanolin oxyethylenated with 16 moles of ethylene oxide | 2.5 g |
| Cetyl stearyl alcohol oxyethylenated with 15 moles of ethylene oxide | 3 g |
| Substituted alkylamine (such as isopropanolamine myristate) | 2 g |
| Triethanolamine, q.s.p. | pH 8 |
| Preservative based on propyl para-hydroxybenzoate sold commercially under the trademark NIPASOL | 0.10 g |
| Water, q.s.p. | 100 g |

EXAMPLE 5

An anti-acne lotion is prepared by mixing the following ingredients:

| | |
|---|---|
| S-carboxymethyl cysteine | 0.25 g |
| Monohydrate of[diisobutylphenoxy-ethoxyethyldimethyl-benzyl] ammonium chloride | 0.75 g |
| Organic base (triethanolamine) | 9 cc |
| Perfume | 0.05 g |
| 96° alcohol | 20.8 g |
| Water, q.s.p. | 100 g |

EXAMPLE 6

An anti-acne lotion is prepared which is identical to the one described in Example 12 except that the cationic quaternary ammonium bactericide is replaced by hexachlorophene.

EXAMPLE 7

An anti-acne foaming gel is prepared by mixing the following ingredients:

| | |
|---|---|
| Reticulated polyacrylic acid sold under the trademark CARBOPOL 934 | 25 g |
| Sulfates of fatty alcohol (magnesium ethoxylauryl sulfate) | 8 g |
| Polyglycol (glycerol) | 10 g |
| Ammonia | 0.2 g |
| S-carboxymethyl cysteine | 2 g |
| Water, q.s.p. | 100 g |

EXAMPLE 8

An anti-acne aerosol foam is prepared by mixing the following ingredients in an aerosol bomb:

| | |
|---|---|
| Reticulated polyacrylic acid sold under the trademark CARBOPOL 934 | 25 g |
| Sulfates of fatty alcohol (magnesium ethoxylauryl sulfates) | 8 g |
| Polyglycol (glycerol) | 10 g |
| Ammonia | 0.2 g |
| S-carboxymethyl cysteine | 2 g |
| Water, q.s.p. | 100 g |

88 g of the above solution is packaged in an aerosol can with 12 g of difluorodichloromethane.

I claim:

1. A method of treating the human skin to diminish excessive secretion by the sebaceous glands comprising applying to the skin so characterized in amounts effective to diminish said excessive secretion a composition comprising an aqueous solution of, as an active ingredient, a compound having the formula

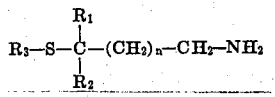

wherein $R_1$ and $R_2$ each independently are selected from the group consisting of hydrogen and lower alkyl having 1-3 carbon atoms, and $R_3$ represents $-(CH_2)_p-R_4$ wherein $R_4$ is selected from the group consisting of $-C_6H_5$ and $-C(C_6H_5)_3$, $p$ is equal to 0, 1 or 2 and n is equal to 0 or 1, said active ingredient being present in amounts of about 0.1-3 percent by weight of said composition.

2. The method of claim 1 wherein said active ingredient is S-benzylcysteamine.

* * * * *